United States Patent
Dofher

(10) Patent No.: US 9,678,297 B2
(45) Date of Patent: Jun. 13, 2017

(54) CONDUIT SYSTEM FOR AN OPTIC WAVEGUIDE AND METHOD FOR INSTALLING A CONDUIT SYSTEM FOR AN OPTIC WAVEGUIDE

(75) Inventor: Darren Dofher, Port Coquitlam (CA)

(73) Assignee: TeraSpan Networks, Inc., Burnaby, British Columbia (CA)

( * ) Notice: Subject to any disclaimer, the term of this patent is extended or adjusted under 35 U.S.C. 154(b) by 400 days.

(21) Appl. No.: 13/578,835

(22) PCT Filed: Feb. 18, 2011

(86) PCT No.: PCT/CA2011/050102
§ 371 (c)(1),
(2), (4) Date: Aug. 14, 2012

(87) PCT Pub. No.: WO2011/100844
PCT Pub. Date: Aug. 25, 2011

(65) Prior Publication Data
US 2013/0044990 A1    Feb. 21, 2013

Related U.S. Application Data

(60) Provisional application No. 61/367,139, filed on Jul. 23, 2010.

(30) Foreign Application Priority Data

Feb. 21, 2010   (IR) .................................. 388120100

(51) Int. Cl.
*G02B 6/44* (2006.01)
*G02B 6/46* (2006.01)
(Continued)

(52) U.S. Cl.
CPC .......... *G02B 6/4459* (2013.01); *G02B 6/4451* (2013.01); *G02B 6/504* (2013.01); *Y10T 29/49826* (2015.01)

(58) Field of Classification Search
CPC .... G02B 6/4459; G02B 6/504; G02B 6/4451; Y10T 29/49826; F16L 33/22
(Continued)

(56) References Cited

U.S. PATENT DOCUMENTS 4,077,472 A * 3/1978 Gano .................... E21B 23/06
166/125
5,120,083 A * 6/1992 Stine ............................ 285/31
(Continued)

FOREIGN PATENT DOCUMENTS

WO    2008134848 A1    11/2008

*Primary Examiner* — Akm Enayet Ullah
(74) *Attorney, Agent, or Firm* — Keller Life Science Law, PA; Michael J. Keller

(57) ABSTRACT

A conduit for housing an optical waveguide is described comprising a rectangular cross-sectional exterior configuration and a cylindrical or semi-cylindrical interior bore. Also described is a method of installing a fiber optic conduit system, including forming a bundle of said conduits arranged as a stack one conduit in width, and forming a trunk line and at least one branch line. Also disclosed is a node housing for an optical waveguide network and a junction protector for an optical waveguide network installation comprising a hollow structure configured to retain a plurality of waveguide conduits, said protector comprising a trunk portion having open ends to receive first and second waveguide conduits, and a branch portion having an open end to receive a third wave guide conduit.

14 Claims, 16 Drawing Sheets

(51) Int. Cl.
*F16L 33/22* (2006.01)
*G02B 6/50* (2006.01)

(58) Field of Classification Search
USPC .............. 285/257; 385/80–99, 135–139, 147
See application file for complete search history.

(56) References Cited

U.S. PATENT DOCUMENTS

| | | | | |
|---|---|---|---|---|
| 5,217,667 | A * | 6/1993 | Griffith | 264/152 |
| 6,321,845 | B1 * | 11/2001 | Deaton | E21B 34/06 |
| | | | | 166/113 |
| 6,684,649 | B1 * | 2/2004 | Thompson | B01D 53/263 |
| | | | | 62/272 |
| 7,086,464 | B2 * | 8/2006 | Edwards | E21B 17/18 |
| | | | | 166/250.1 |
| 9,068,415 | B2 * | 6/2015 | Fraser | E21B 23/00 |
| 2010/0086254 | A1 * | 4/2010 | Dofher | G02B 6/504 |
| | | | | 385/24 |
| 2014/0291982 | A1 * | 10/2014 | Orr | F16L 33/22 |
| | | | | 285/257 |

* cited by examiner

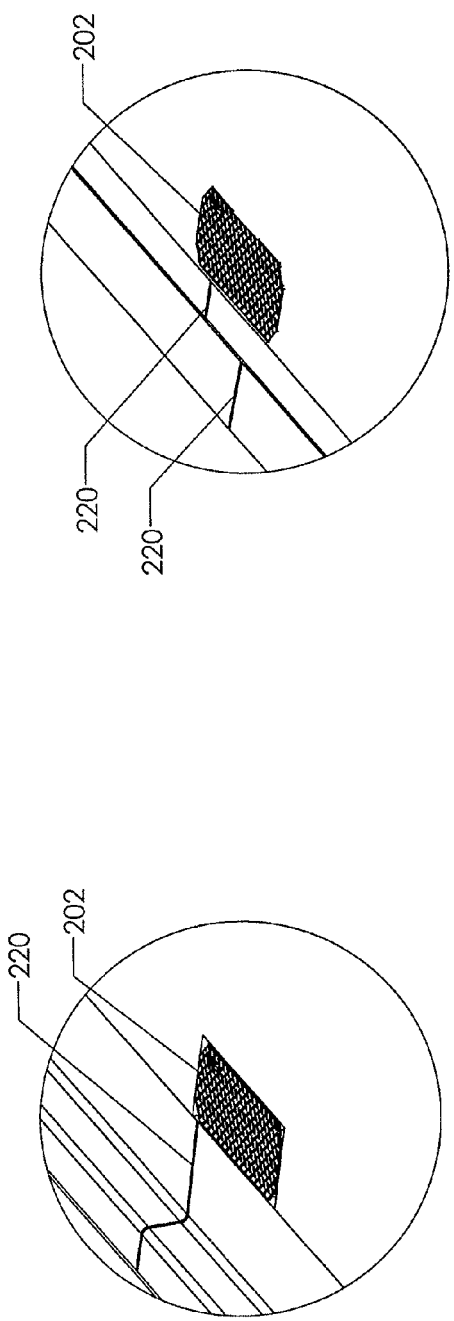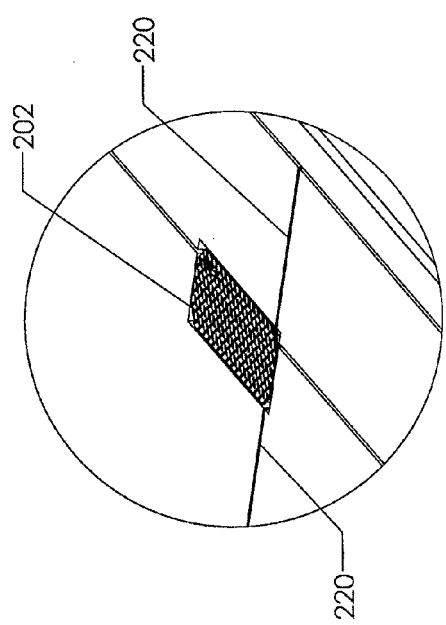
fig. 6C
fig. 6B
fig. 6A

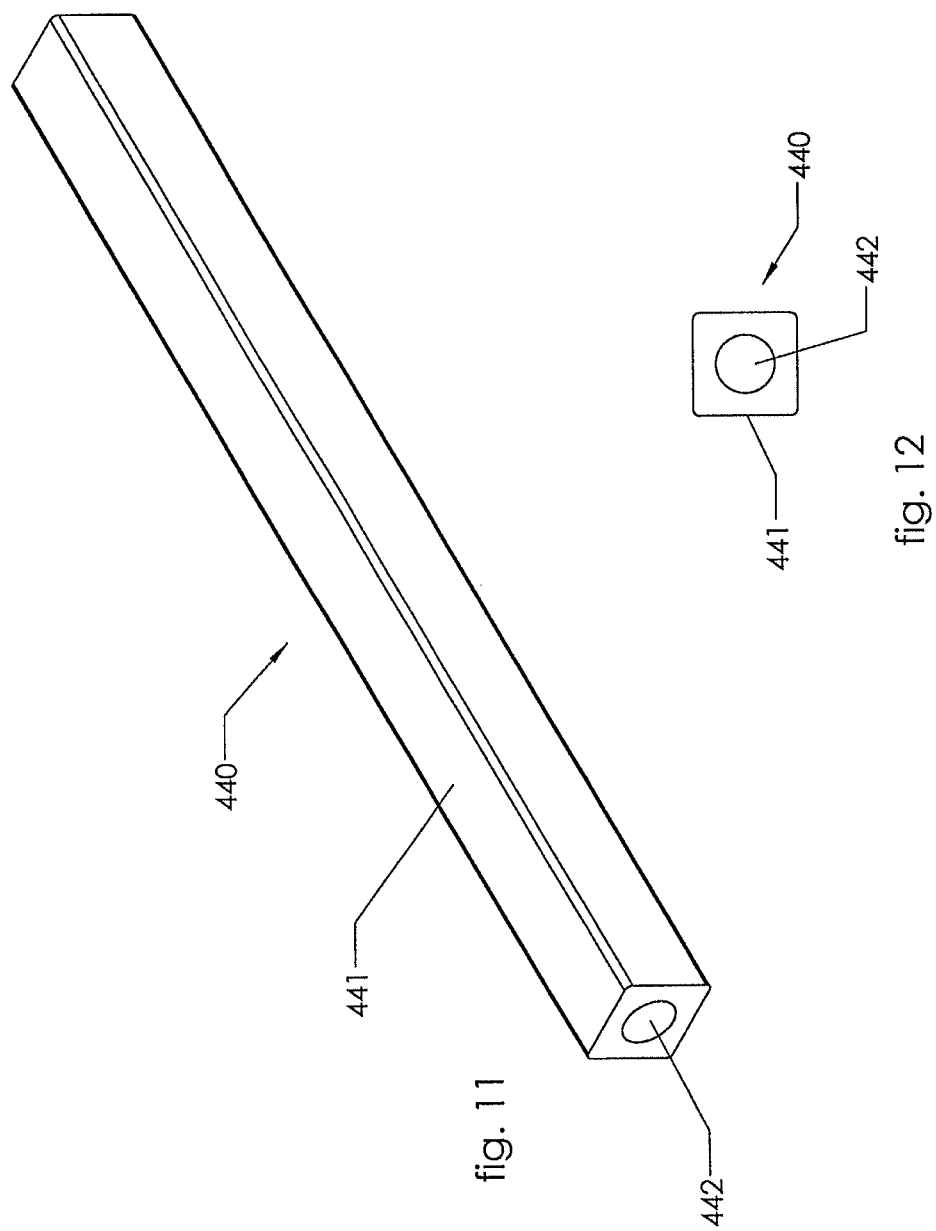

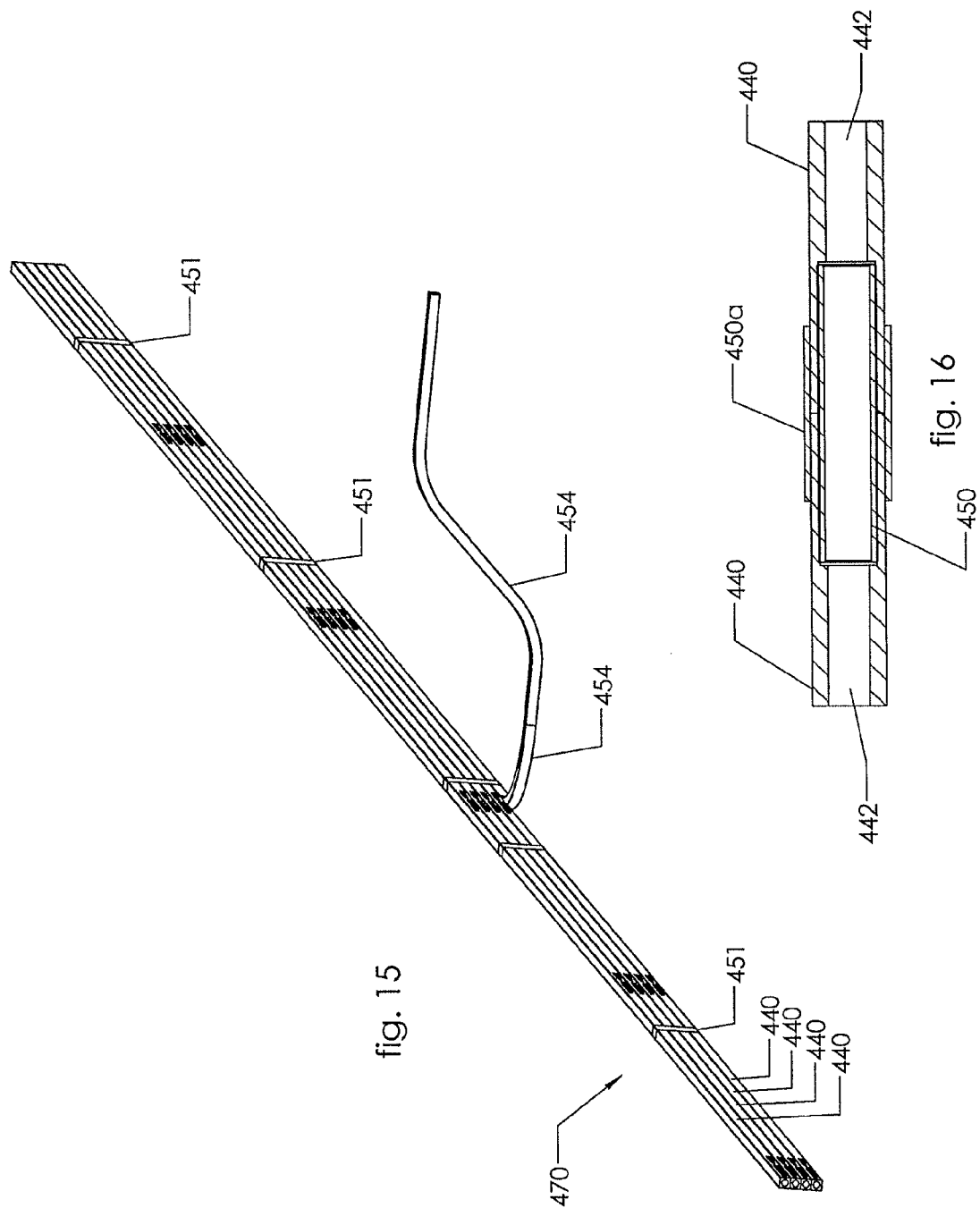

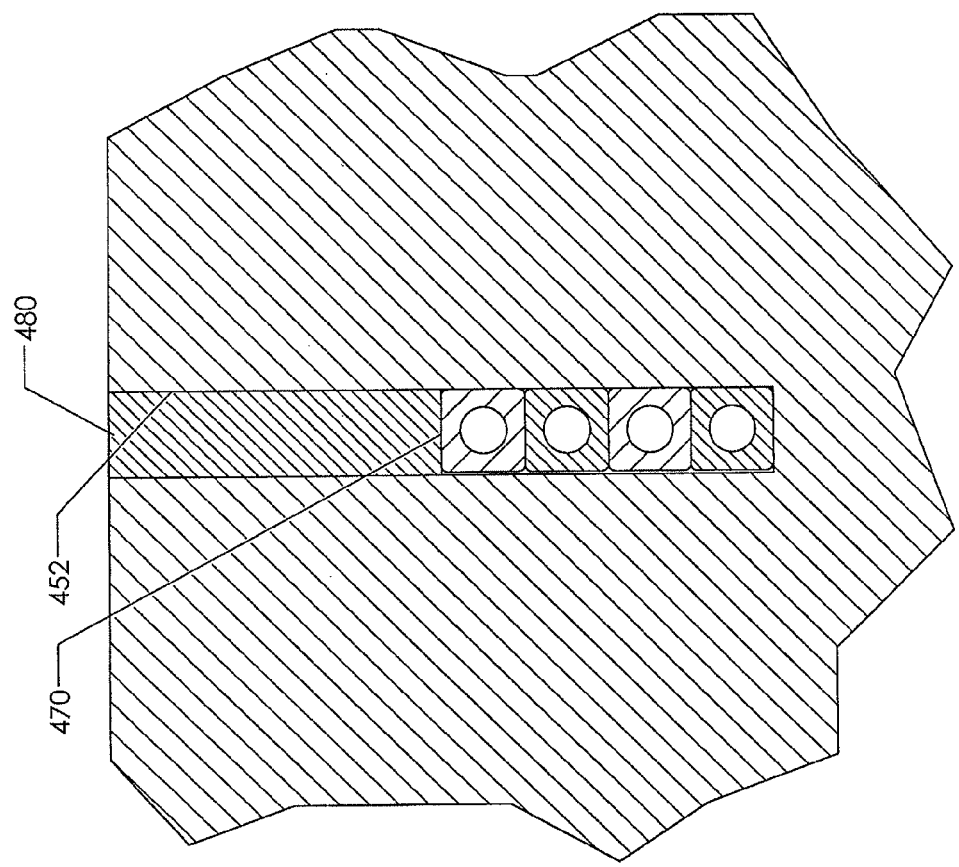

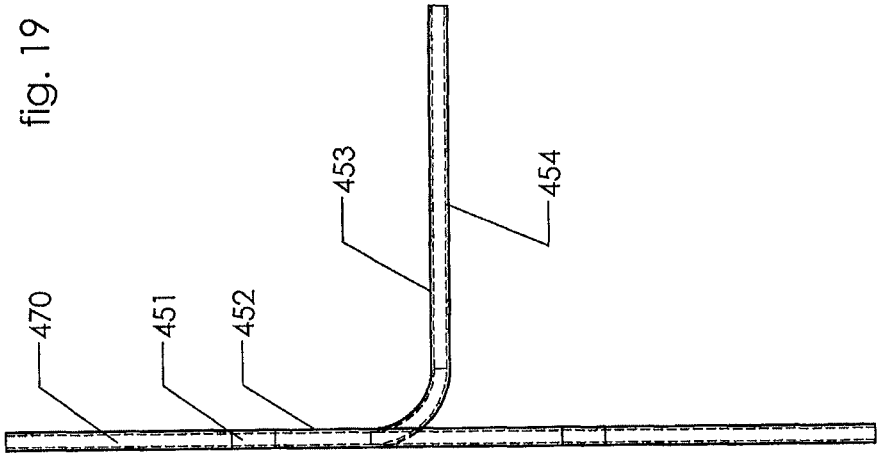

CONDUIT SYSTEM FOR AN OPTIC WAVEGUIDE AND METHOD FOR INSTALLING A CONDUIT SYSTEM FOR AN OPTIC WAVEGUIDE

RELATED APPLICATIONS

This application claims priority to International Application No. PCT/CA2011/050102, filed on Feb. 18, 2011, which claims priority to Iranian Patent Application No. 388120100, filed on Feb. 21, 2010 and U.S. Provisional Patent Application No. 61/367,139, filed on Jul. 23, 2010. Each of the above-referenced applications is incorporated herein by reference in its entirety.

FIELD OF THE INVENTION

The present invention relates to fibre optic networks, in particular fibre optic networks buried below a surface, wherein the fibre optic cables and fibres are protected from the elements by an external duct or conduit. The invention relates in particular to components for housing the optic waveguides, including junction protectors and conduits, and methods of installing such components within a surface.

BACKGROUND

Installation of fibre optic networks within a surface, such as an urban landscape, requires various protective components for protecting delicate components of the system. In particular, particular requirements are imposed on components for use with a system which is installed at least partially using micro-trenching and surface inlay methods. For example, such installations can require the installation of specialized protective housings at system nodes and intersections between trunk and branch lines. There is also a need for narrow ducts or conduits that can be used within a micro-trench system, and in particular to a system for coupling together ducts with only a minimal increase in bulk at the region of the coupling.

Buried fibre optic cable networks generally comprise a series of nodes, as well as intersections between trunk and branch lines. The nodes are buried within the surface in an accessible fashion, and can house various system components. The branch lines may lead to collection points, or to individual houses or buildings. The present inventor has previously described in WO/2002/065182 a system for a fibre optic network, and also a protective conduit described in the inventor's U.S. Pat. No. 6,807,355. A system for optical waveguide installations is also disclosed in PCT/CA2008/000051 by the present inventor. All of the above references are incorporated herein by reference.

SUMMARY OF THE INVENTION

According to one aspect, the invention relates to components for use with surface inlay installations of fibre optic networks within an array of narrow trenches, or "micro-trenches," within a surface. An installation of this type usually includes a plurality of fibre optic cables, such as trunk and branch lines.

In one aspect, the network includes at least one node and at least one conduit for installation within a trench. In one aspect, the conduit is configured to retain one or more cables. The conduit can be of the type that comprises a pair of spaced apart opposing vertical walls that define an enclosed vertically elongated space therebetween. The conduit can have at least one horizontal internal divider to divide the space into a plurality of vertically aligned internal compartments extending lengthwise along the member.

According to one aspect, the invention relates to housings for protecting the node of an optical waveguide network. The housing is intended for at least partial burial within a surface. The housing has an open interior configured to retain at least one network component therein, and comprises a base and a periphery defined by side walls, end walls and corner walls. Adjacent ones of said side and end walls are spaced apart and said corner walls are located in the space between said adjacent side and end walls and disposed at an angle relative to the adjacent end and side walls. The housing further comprises an array of slots within said corner walls for the entry and exit of waveguide conduits into said housing. The housing may have an open top and an upper rim defined by said walls and wherein said slots are open to said rim, said slots being substantially vertical in orientation and located and configured in opposing and aligned pairs to permit a straight-line saw cut within said surface to pass through said pairs of slots. A removable cover may be provided for covering said open top.

The slots are configured to receive a waveguide conduit configured to fit within a micro-trench, said conduit having opposing sidewalls defining a narrow interior space therebetween.

In another aspect, the invention relates to a conduit for a waveguide, comprising an elongate member having a generally rectangular cross-sectional external configuration with an internal bore that is cylindrical or semi-cylindrical. In one aspect, the exterior cross-sectional configuration of said conduit is square, and the ratio of the diameter of the bore to the width of each exterior side is approximately 0.56, plus or minus up to 20%. In another aspect, at least one end of said conduit comprises a segment having a cylindrical exterior configuration for fitting said conduit into a round opening.

In another aspect, the invention relates to method of installing a fibre optic conduit system within a surface comprising the steps of:

providing a plurality of conduits each comprising a rectangular cross-sectional exterior configuration and a cylindrical interior bore;

forming a bundle of said conduits arranged as a stack one conduit in width, and fastening said stack together;

forming a trunk channel within said surface, said trench having a width and depth for fitting said bundle therein;

installing said bundle within said channel, and restoring the surface with a material. In one aspect, the stack is installed within the channel without any external sheathing apart from optional tape, wrapping or other means for fastening the conduits together.

In another aspect, the invention relates to an installation of a waveguide network which includes said rectangular conduits. The installation involves the steps of forming at least one branch conduit leading away from the trunk conduits, by forming a branching channel connecting with but leading away from the trunk channel, separating one or more individual branching conduits from the bundle of conduits, and directing said individual branching conduits into said branch channel. The branch channel and said individual branching conduit may comprise a stub, wherein the method comprises the further step of extending said stub during a subsequent installation stage, said extending comprising the steps of removing the material at said branch channel to expose the stub of conduit, extending said channel within said surface, exposing the terminal end of said stub above the surface, and joining a length additional conduit to said stub, installing said extended conduit with the extended branch channel, and restoring the surface.

In another aspect, the invention relates to the step of joining two of said rectangular conduits in end to end relationship by forming an end segment in respective ones of said conduits having a cylindrical external configuration, providing a tubular cylindrical sleeve, and fitting said sleeve over the respective ones of said end segments in end to end relationship to join said conduits together. The end segment may be formed by cutting the end of each of said conduits at the installation site with a rotary cutting tool, said tool comprising an exterior shell having at least one cutting blade thereon, a central rod for insertion into said bore, and an annular space between the rod and the shell wherein contacting an end of the conduit with said rotating tool forms said segment.

According to another aspect, the invention relates to a bundle of waveguide conduits which include sequential, non-repeating distance and directional markers on each of said conduits extending the full length thereof. The bundle is formed such that the starting numbers on respective ones of said conduits all differ from each other at an end of the bundle. The numerical differences between the values on individual conduits is maintained all the full length of the bundle. According to this aspect, the numerical differences in value between the markers on said conduits are determined and optionally recorded and stored as a stored value in a database, thereby differentiating the respective ones of said conduits from each other through the full length of said bundle, including any branching individual conduits leading away from the main bundle.

The invention further relates to a junction protector for an optical waveguide network installation comprising a hollow structure configured to retain a plurality of waveguide conduits, said protector comprising a trunk portion having open ends to receive first and second waveguide conduits, and a branch portion having an open end to receive a third waveguide conduit. The waveguide conduits may comprise a plurality of internal passageways for independently retaining waveguides. In this aspect, the housing comprises a hollow base having sidewalls and a plurality of removable inserts configured to fit within said base between said sidewalls, said inserts each comprising a hollow interior passageway and configured to align with the internal passageways of said waveguide conduits when said inserts are positioned within said base. When the internal passageways within said waveguide conduits are vertically aligned atop one another, the removable inserts can be configured to be stacked vertically one atop another for alignment with said waveguide conduits. The junction protector is configured such that said branch portion is curved, and merges with said trunk portion at an acute angle.

According to another aspect, the invention relates to a method of coupling together lengths of tubing end to end. Preferably, the tubing comprises a material which is at least somewhat resilient to permit radial expansion without undue force, and which can be melted at a relatively low temperature. The method includes the steps of fitting an inner coupler, consisting of a thin-walled tube, within the respective bores of both of said tubes and urging the tubes together in abutting end to end relationship. The inner coupler is selected to have an outside diameter that is somewhat larger than the inside diameter of the tube bores, so as to radially expand the tubes where they fit over the coupler. An outer sleeve is provided, which has an inside diameter sized to provide a snug fit over the joint region of the abutting tubes. The outer sleeve is thin-walled, to minimize the bulk of the coupling. The outer sleeve is positioned over the joint. The coupler and sleeve comprise a material which resists melting at the low temperature, and with at least the sleeve, or both sleeve and coupler, also having a relatively high heat conductivity. A metal such as aluminum or stainless steel permits these components to be thin-walled, heat conductive, and having a higher melting point than the plastic tubing. The method then comprises the further step of heating the sleeve in order to at least partially melt the tubing located within the sleeve so as to fuse the sleeve to the overlying tubes to form a leak proof sealed coupling.

Directional references such as "vertical" as used herein are for convenience of description only and are not intended to limit the scope of the invention. It will be evident that one may orient the elements described herein any direction. As well, any explicit or implicit references to relative or absolute dimensions are for purposes of illustration or description of certain embodiments, and are not intended to limit the scope of the invention.

The term "cylindrical" herein includes shapes that depart from a circular cross section, for example oval, elliptical and the like, unless expressly stated otherwise or the context otherwise suggests. The term "semi-cylindrical" refers to ovaloid shapes which depart from the cylindrical. As well, references herein to rectangular shapes such as square, non-square rectangle and the like include shapes which slightly depart from geometric perfection, for example by having rounded corners, slightly bowed sidewalls, etc.

BRIEF DESCRIPTION OF THE DRAWINGS

FIGS. 6A-C are detailed views of portions A, B and C of FIG. 5.

FIG. 11 is perspective views of an alternative embodiment of the conduit for retaining waveguides.

FIG. 12 is an end view of the conduit of FIG. 11.

FIG. 15 is a perspective view of a bundle of the conduits of FIGS. 11-14, comprising a trunk line and a branch line.

FIG. 16 is a sectional view of two conduits according to FIGS. 11 and 12, coupled end to end with an alternative coupling system.

FIGS. 18 and 19 show a bundle of conduits installed within channels that have been cut into a surface.

DETAILED DESCRIPTION

In one aspect, the invention relates to a network of fibre optic waveguides that may be installed within an urban landscape of streets, sidewalks and the like. An example of one such installation, seen in FIG. 5, includes an array of nodes 200 connected by fiber optic lines buried within micro-trenches. The term "micro-trench" refers to a relatively narrow and shallow trench which can be cut with a single pass of a rotary saw; the term "trench" is interchangeable with "channel". Typically such trenches are about 15 mm or less in width. The cables, conduits, and other components installed within the network are relatively narrow, and may be installed by surface inlay techniques. Nodes 200 can provide locations to store excess cable or to house an intersection of waveguide cables, or other system components. At each node 200 is located a node access housings 202, which is at least partially buried within the substrate at the node locations.

Figure 1:
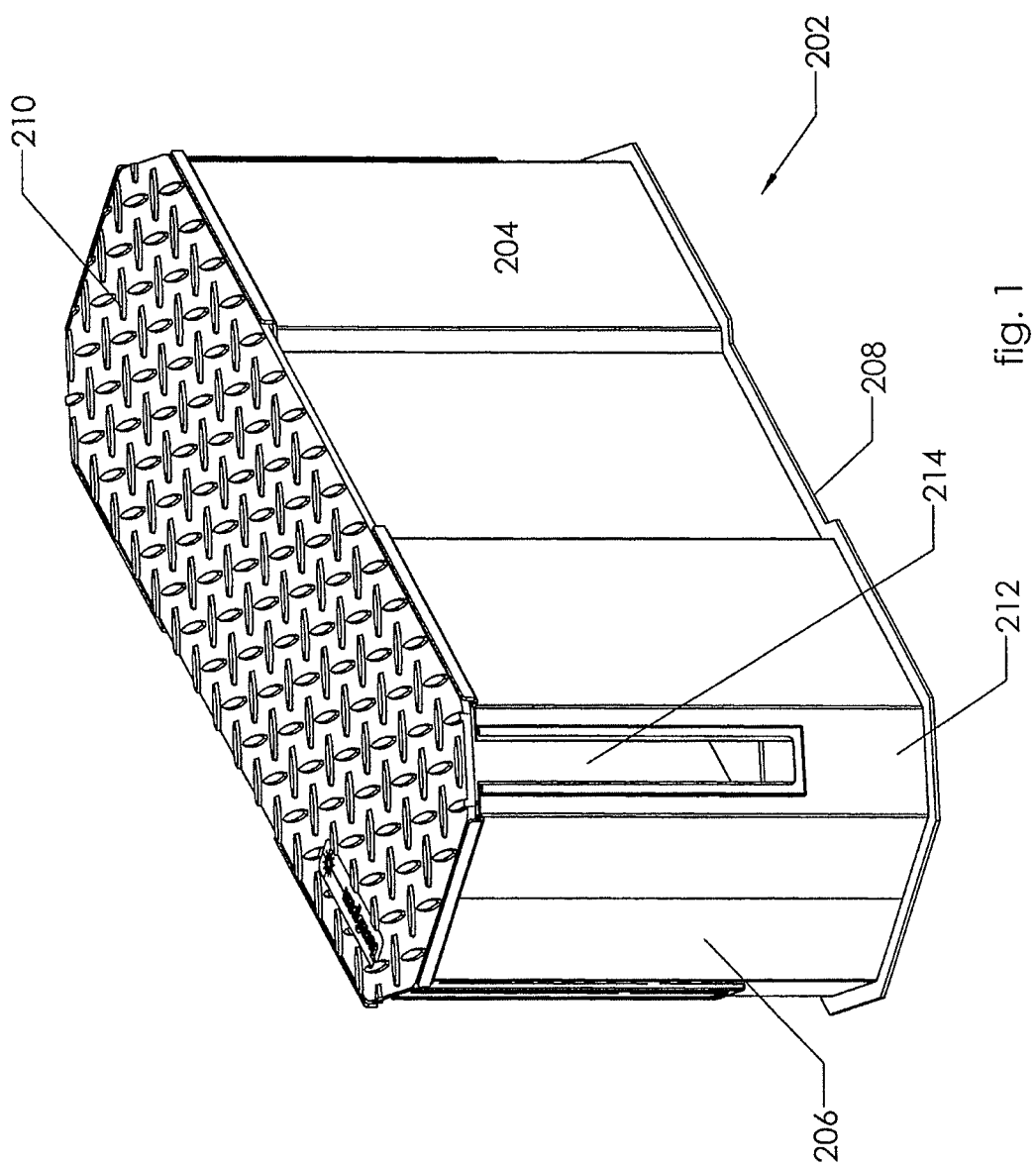
FIG. 1 is a perspective view of a node protector for use with the invention.
Figure 2:
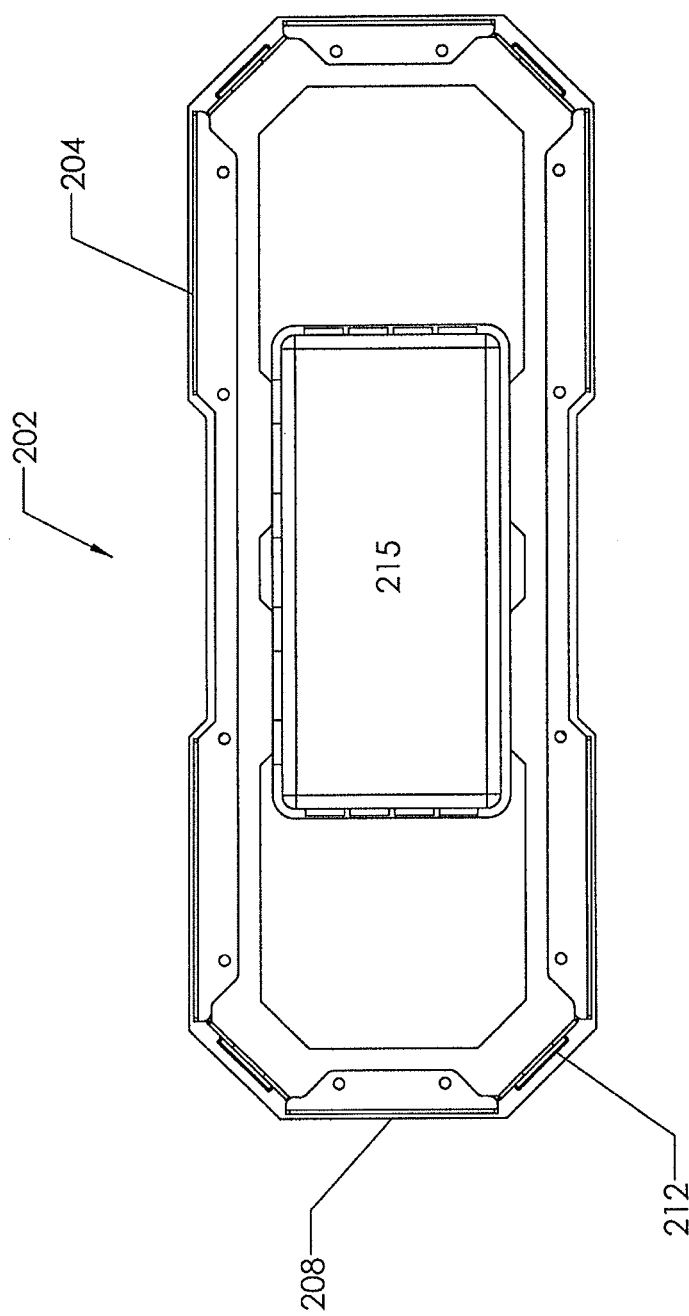
FIG. 2 is a plan view, from above, of the node protector with a splice terminal installed therein.
Figure 3:
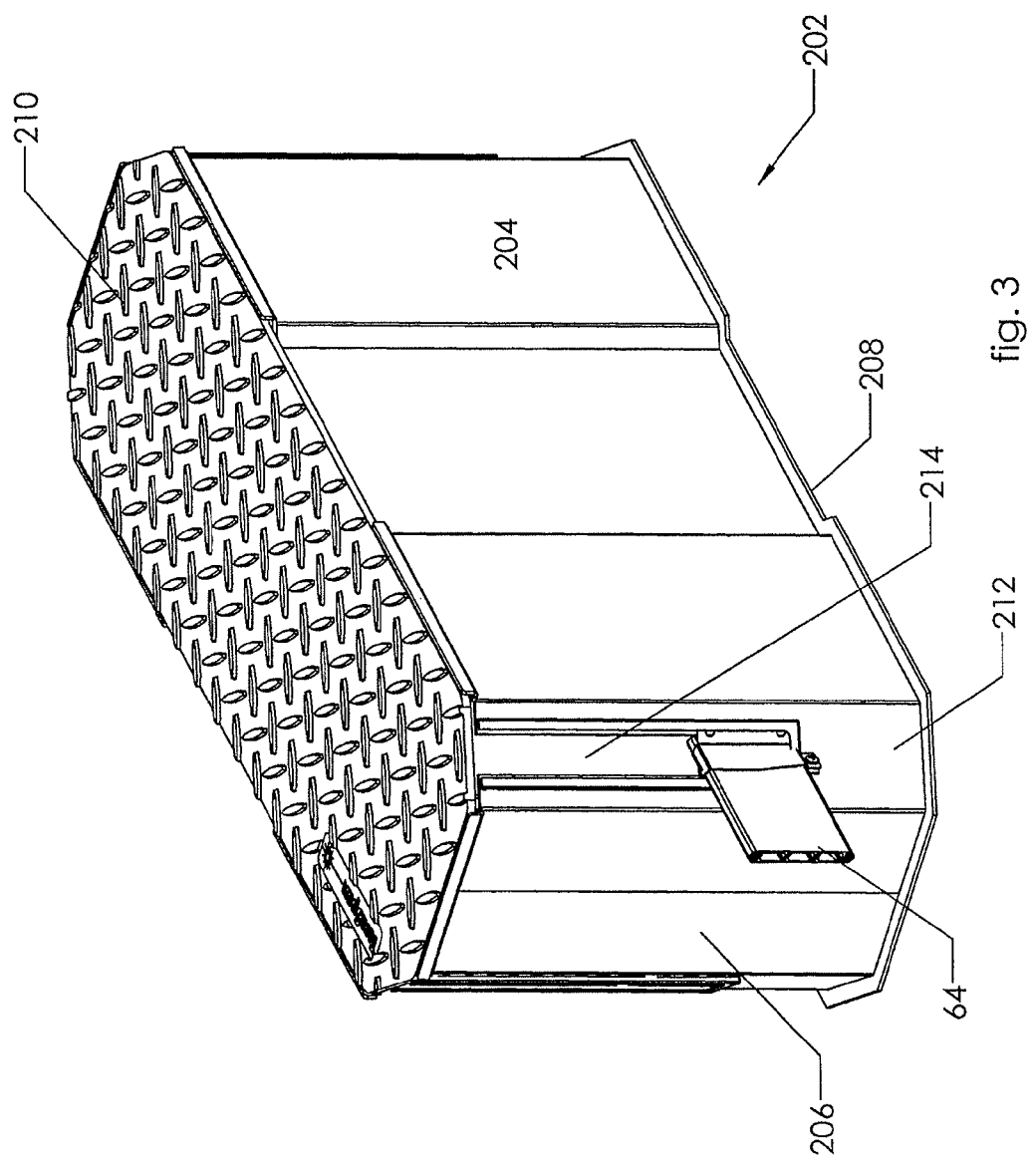
FIG. 3 is a further perspective view of the node protector, with the top removed and an optic waveguide conduit installed therein

Access housing 202, seen in more detail in FIGS. 1, 2 and 3, is a boxlike structure which is generally rectangular in configuration, composed of side plates 204, end plates 206, a flat base 208 and a removable top 210. Corner walls 212 are located at the intersections between the side and end walls and are disposed at about a 45° angle relative to the adjacent side and end walls. Opposing corner walls are thus parallel to each other. Housing 202 may be installed such that top 210 is exposed to permit easy access to the interior of the housing. Top 10 comprises a rigid and durable surface capable of withstanding street traffic. Corner walls 212 each include a vertical slot 214, which is open to the upper rim of the housing. The slots are located such that pairs of slots within opposing corner walls are horizontally aligned. This permits a conduit to pass straight through the housing without flexing. The alignment of the slots, and their open upper ends, facilitates construction of the network. The housings 202 may be installed in the surface in the desired locations, followed by cutting the micro-trenches leading to the housings. The saw cuts may pass straight through opposing slots.

As seen in FIG. 3, slots 214 permit conduits 16 to enter and exit the housing. The width of slots 214 is sufficient to permit a selected waveguide conduit to pass through the slot at an angle, such that the conduit extends parallel to either of the side or end wall of housing 202.

Figure 4:
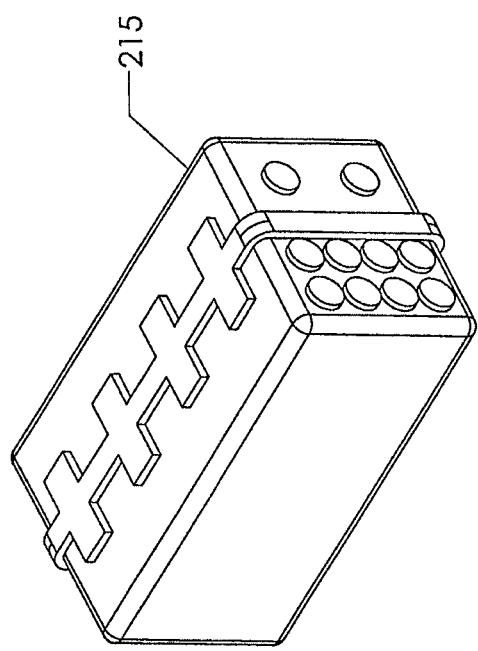
FIG. 4 is a perspective view of a terminal for use with the invention.

Housing 202 includes one or more water drainage openings (not shown). Removable top 210 may be fitted to the housing with any suitable fastener, such as bolts or other fasteners (not shown). In one non-limiting example, housing 202 can be 368 mm in height, 292 mm in width and 812 mm in length. The rectangular configuration readily accommodates a removable rectangular terminal 215, which provides a waterproof openable case for forming a cable junction. FIG. 4 shows terminal 215 in more detail, configured to fit snugly within housing 202. FIG. 2 shows terminal 215 installed within housing 202.

Installation of housing 202 as a component of the system involves preparing a rectangular opening in the surface, into which housing 202 is placed in the appropriate orientation, typically with the long axis of housing 202 parallel to the direction of the street. One or more narrow, linear slots for retaining the conduits are then cut into the surface, as generally described above. The cuts are made with a rotary saw operated to travel in a linear path, which can pass through slots 214 without damaging housing 202. The saw cut is made with a single pass, such that the saw travels in a straight line without substantial change in cutting depth as it passes through opposing aligned slots 214. Alternatively, the saw may be somewhat elevated as it approaches the housing to somewhat reduce the depth of the cut, but otherwise maintained in its cutting position. The depth of such a cut is selected such when the cut is at or adjacent to the housing, the depth is no greater than the depth of slot 214 when installed in the surface, to avoid contact of the saw with housing 202. In this manner, the cut will accurately position waveguide conduits 64 to enter and exit housing 202 through slots 214. The location of slots 214 on the corner walls, permits a cut to line with the slot from either of the end or side of housing 202.

Figure 5:
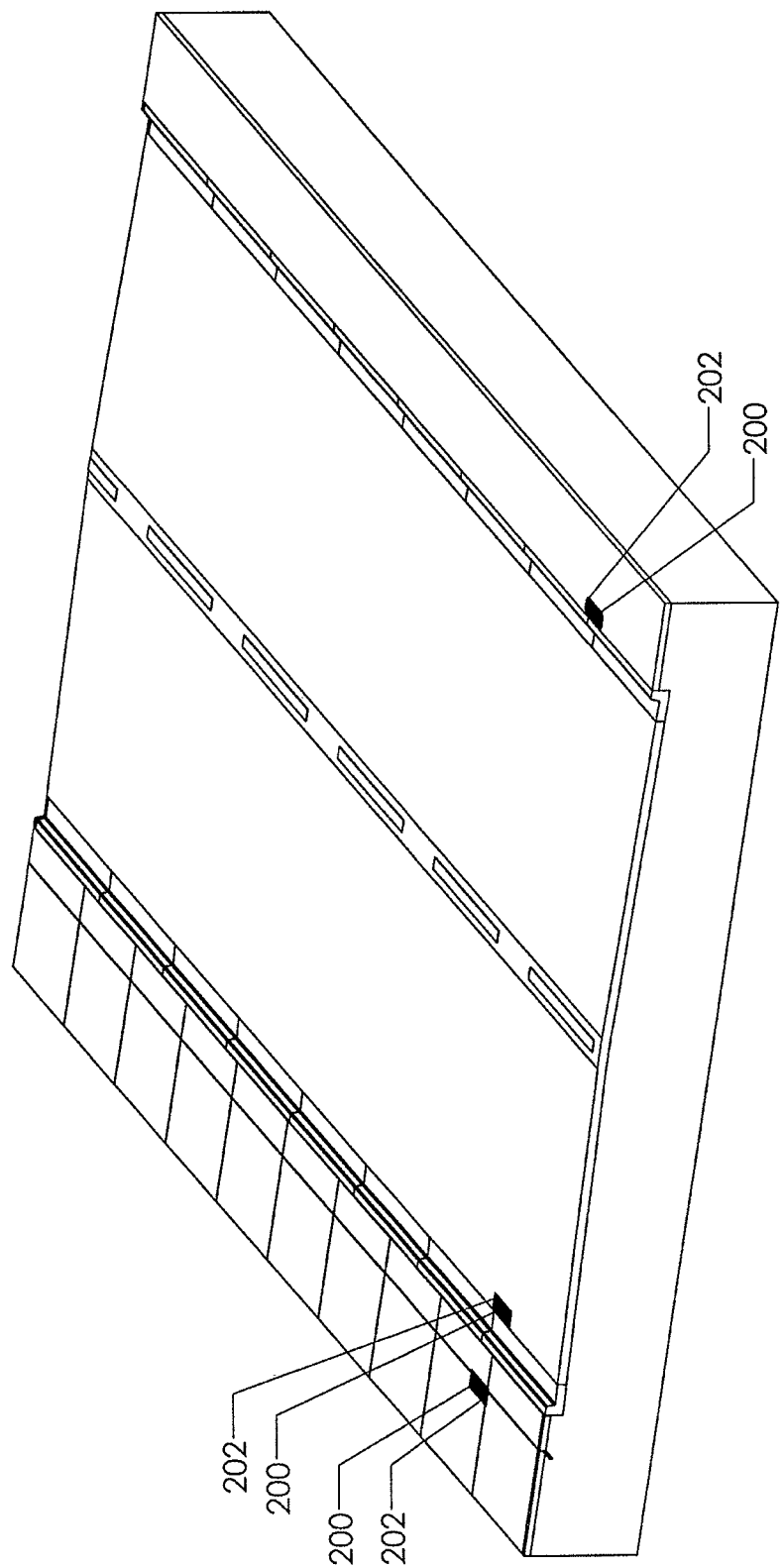
FIG. 5 is a schematic view of the node protector installed in a city street.

FIGS. 5 and 6A, B and C show an example of an installation which includes several nodes 200, installed at various locations on a street and sidewalk. The nodes are installed such that street cuts 220 intersect with the housing 202 at various locations and from different directions, as seen in FIGS. 6 A, B and C. The street cuts may either terminate at housing 202, as seen in FIGS. 6 A and 6 C, or extend though housing 202 as seen in FIG. 6 B.

Figure 7:
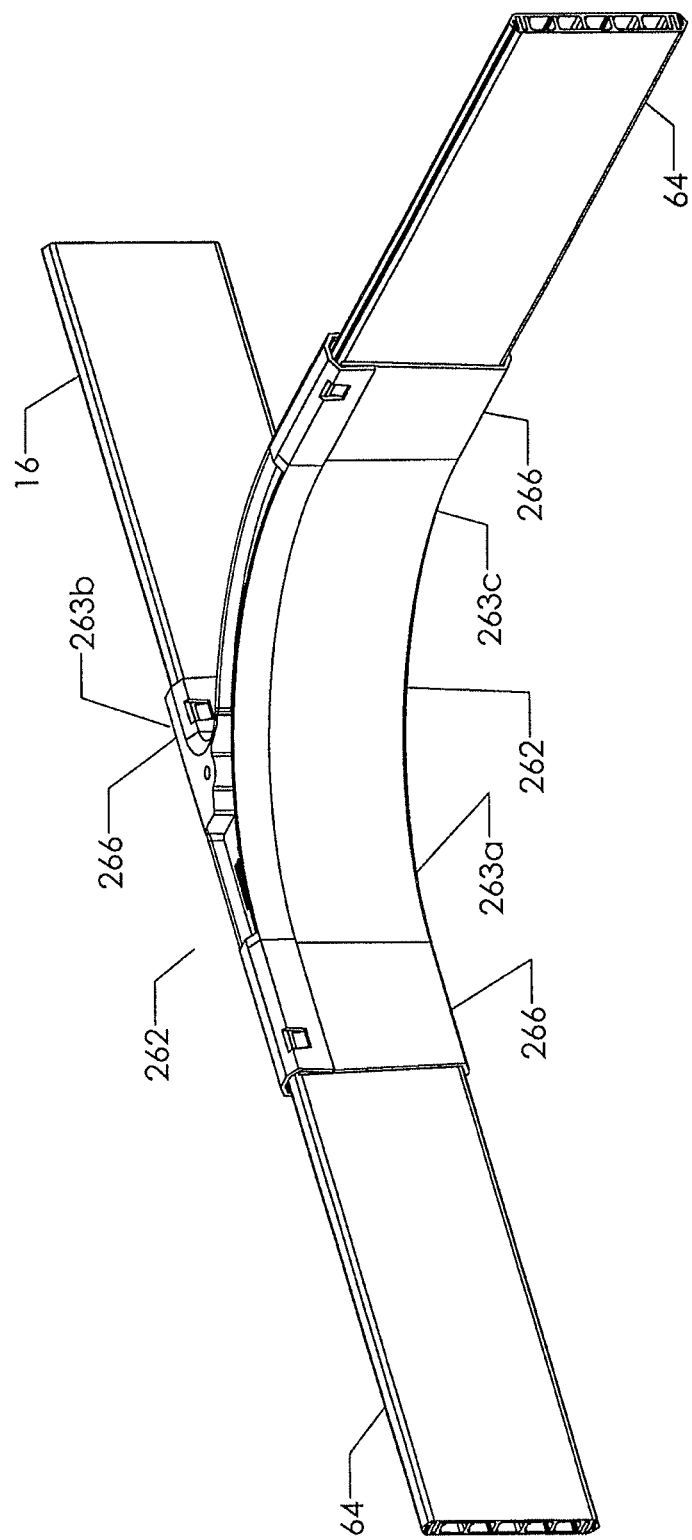
FIG. 7 is a perspective view of a Y-junction housing for use with the present invention.
Figure 8:
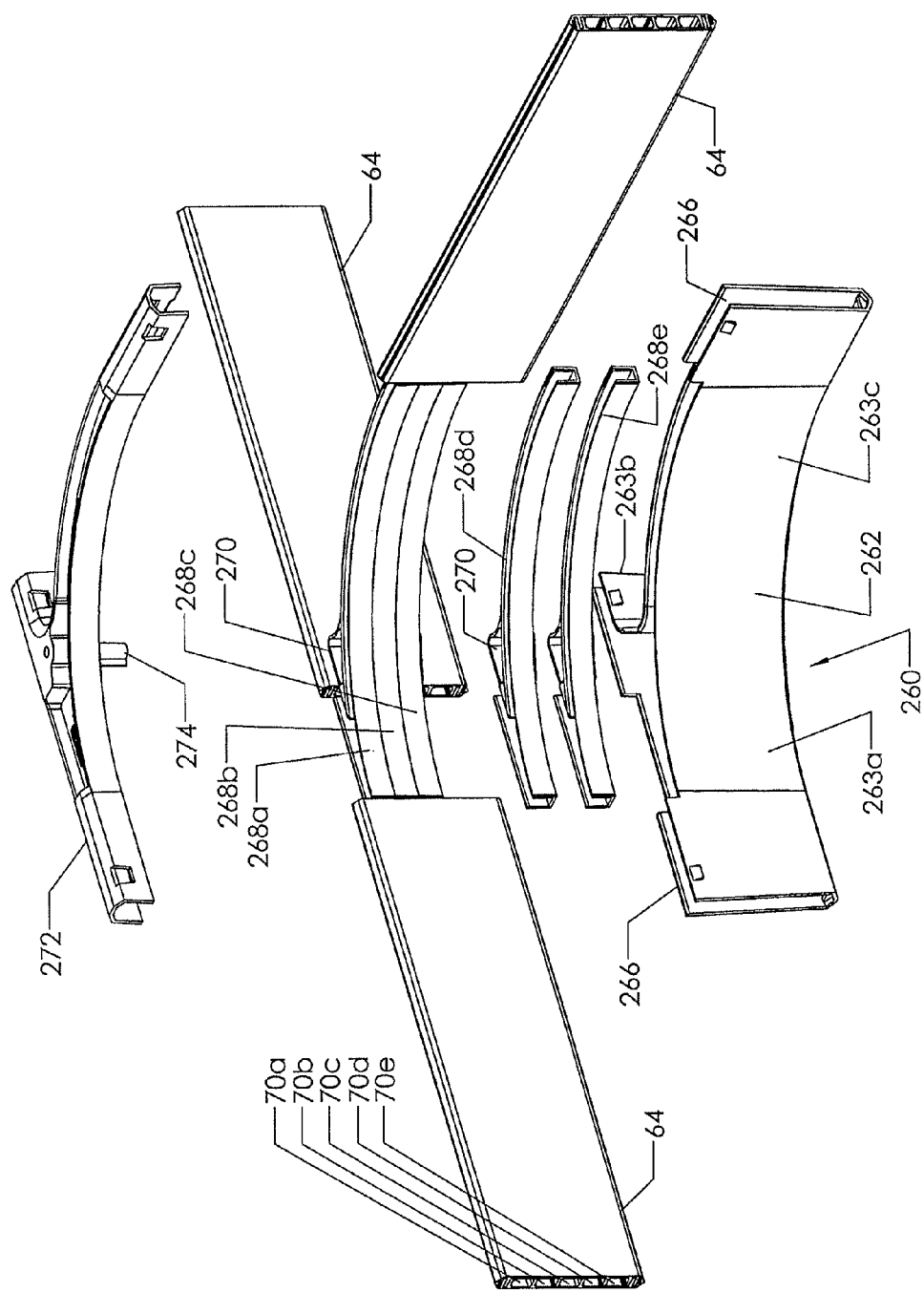
FIG. 8 is an exploded view of the junction housing of FIG. 7.

FIGS. 7 and 8 illustrate a junction protector which houses and protects waveguide components at a three-way intersection between a trunk line of a waveguide and a branch line. The junction protector comprises a housing 260, have a generally Y-shaped configuration for accommodating intersecting waveguides in the form of an angled, Y-shaped branch. Y-housing 260 comprises a Y-shaped base 262 having opposed sidewalls, a hollow interior 264 and an open top. Base 262 comprises three limbs; two of the limbs 263a and b are directly opposed to each other and define a main axis which is essentially linear. A third limb 263c forms a branching axis which curves away from the main axis to provide a branching line having relatively gentle curvature at the intersection with the trunk line. The initial angle of incidence is thus acute relative to the axis of the trunk line. This structure accommodates a waveguide that is unable to readily accommodate a small radius curve or bend, while permitting an uninterrupted pathway for the waveguide.

Base 262 includes widened end receptacles 266 at the three terminals thereof, to receive conduits 64 in a snug friction fit. Conduits 64 terminate at receptacles 266. One or more inserts 268 fit within the interior 264 of base 262 to retain the waveguide cables in alignment with the internal subcompartments 70a through e. Each insert 268 has a hollow interior space which generally corresponds with the shape of base 262 in that it comprises a linear segment and a curved branch segment which branches from the linear segment. The segments communicate internally, allowing a waveguide to be routed in either a straight path or a curved path leading to a branching conduit. Inserts 268 are configured such that when stacked, they align with the subcompartments within the conduits. Inserts 268 are configured to stack in vertical alignment. The number of stacked inserts will normally correspond to the number of vertically aligned subcompartments within the conduits installed within the network, which will vary depending on the user's requirements. Inserts 268 include a vertical through-space 270. Through spaces 270 are vertically aligned when inserts 268 are stacked. Inserts 268 are capped at their uppermost level by a cap 272, which is configured to fully cover the inserts 268, and which is friction fitted over the outside surface of the uppermost insert 268 to enclose the interior space. Optionally, the cap may be waterproof sealed to the base 262. A peg 274 protrudes downwardly from cap 272, to fit within the aligned spaces 270 of inserts 268 to hold inserts 268 in position.

Insertion of a waveguide through the Y-shaped housing 260 can be accomplished with a stiff tape, referred to as a "rodder," which can pass through the housing into the third limb 263c, and into the corresponding conduit 64 joining with third limb 263c.

Figure 9:
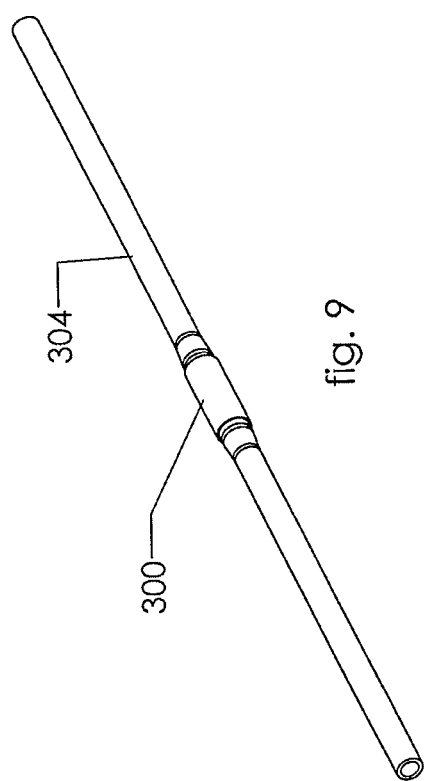
FIG. 9 is a perspective view of a novel pipe coupler.
Figure 10:
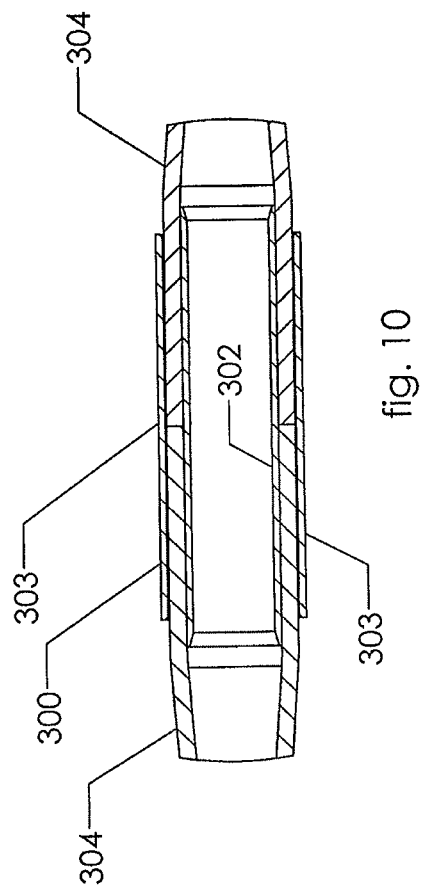
FIG. 10 is a sectional view of the pipe coupler shown in FIG. 9.

FIGS. 9 and 10 illustrate a coupler 300 that can be used to couple lengths of tubing 304 together in end to end relation, with minimal increase in the external diameter or decrease in internal diameter of the tubing at the region of the joint. Tubing 304 can comprise relatively narrow diameter conduit for housing a waveguide. Preferably, tubing 304 is plastic, with a relatively low melting point. Coupler 300 has a narrow profile and may be used to join lengths of such tubing together end to end, while still fitting within a conduit 64 or within a microtrench. Coupler 300 comprises an inner coupling member 302 consisting of a thin walled tube, and a corresponding thin walled sleeve 303, both being preferably fabricated from metal for improved heat conduction and a high melting point in comparison to tubing 304. Coupling member 302 is friction fitted the interior of plastic tubing 304, within end sections of opposing lengths of tubing that are to be joined together. The outside diameter of member 302 is selected to be larger than the inside diameter of tubing 304. As a result, tubing 304 is slightly expanded when fitted over member 302. Sleeve 303 is friction fitted snugly on the outside of plastic tubing 304 directly overlying inner tube 302 such that members 302 and 303 are concentric and generally aligned lengthwise. However, members 302 and 303 need not be identical in length.

Heat is then applied to sleeve 303 so as to partially melt plastic tubes 304 in the region of the joint underlying sleeve 303. Pressure can also be applied lengthwise to force the butt ends of tube 304 together so as to fuse the end walls together. When the joint is formed in this fashion, coupling member 302 and sleeve 303 serve to prevent tube 304 from collapsing or deforming. By selecting relatively thin-walled metal tubing for the inner and outer members 302 and 303, coupling 300 forms a joint that has only a slight increase in diameter over the adjacent plastic tubing.

FIGS. 11-19 show a further aspect, relating to a conduit 440 having a rectangular (square) cross-sectional configuration comprised of substantially flat exterior faces 441 and a tubular bore 442 for housing fibre optic cables. This configuration provides benefits including the ability to easily form stacked bundles and a superior level of strength and resistance to crushing or damage, in particular (but not solely) when the ratio of exterior wall width to inside diameter described herein is maintained. Conduit 440 may alternatively have a non-square rectangular cross-sectional configuration, with the bore having a non-circular, semi-cylindrical configuration (oval, elliptical, etc.) with a similar height/width ratio. Conduit 440 may be made of any suitable material, such as PVC or HDPE plastic. A relatively flexible material such as extruded HDPE is particularly useful, in that it permits the conduit to be deployed in a variety of network arrangements, as will be described in more detail below. A fibre optic cable may be installed within the bore by any suitable means, such as threading or blowing the cable through the bore.

Figure 13:
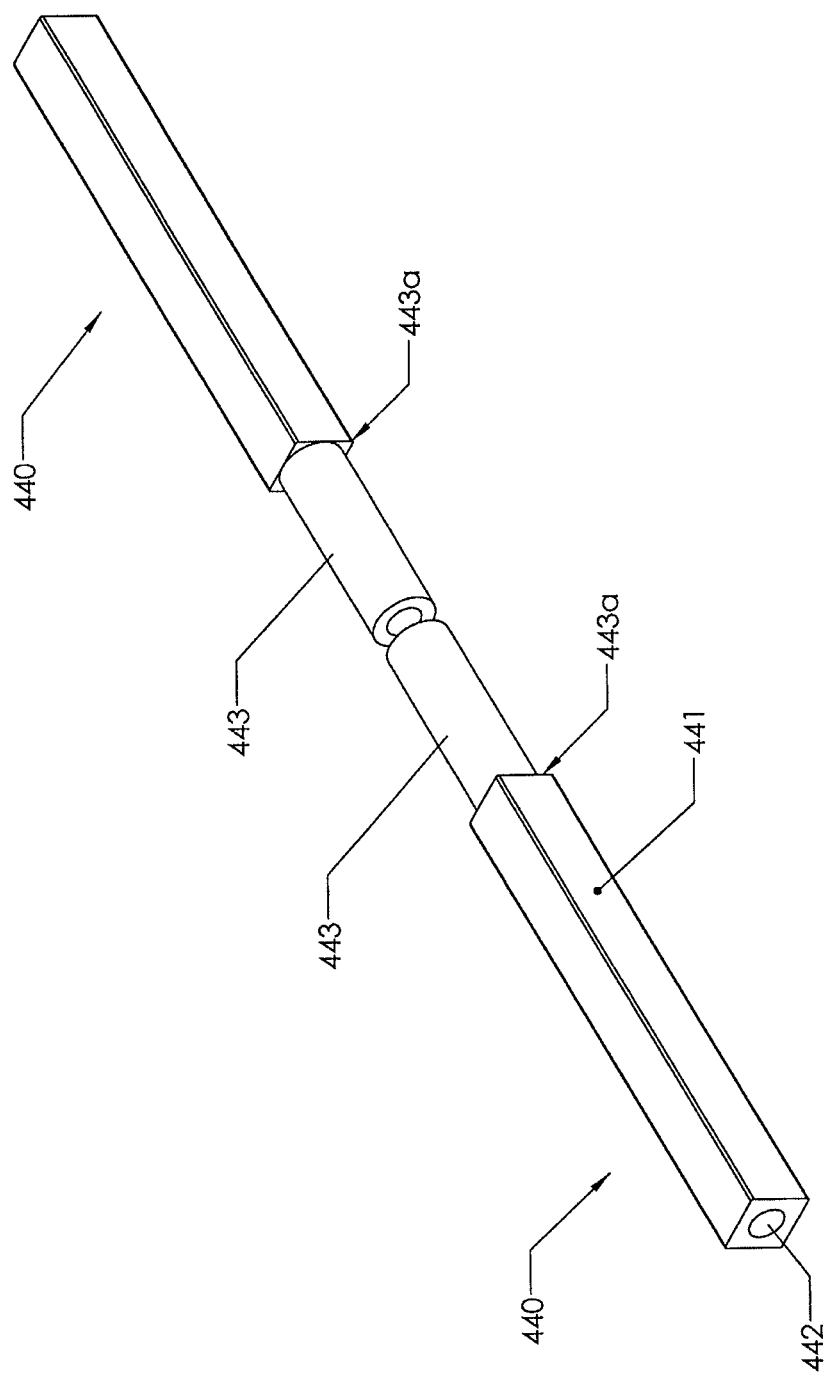
FIG. 13 is a perspective view of two conduits according to the alternative embodiments, with end segments prepared for coupling.
Figure 14:
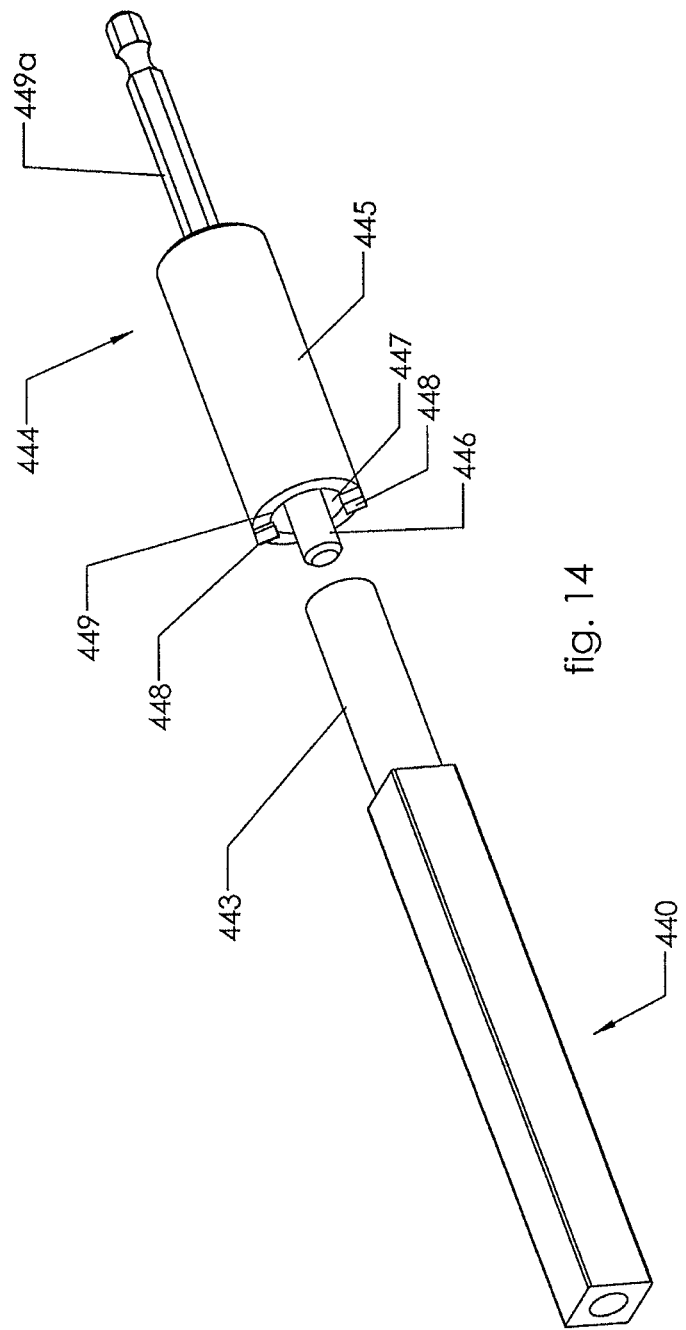
FIG. 14 is a perspective view of a conduit of FIG. 13, and a tool for generating the end segment.

Conduit 440 can be provided with a cylindrical end segment 443 having a rounded external surface to permit its use with conventional fittings configured for round conduits. As seen in FIGS. 13 and 14, end segment 443 comprises essentially a cylindrical tube, formed by a removing portions of flat faces 441. An end face or shoulder 443a is located where segment 443 commences. The length and external diameter of end segment 443 are selected to permit a snug fit with a selected fitting. Shoulder 443a serves as a convenient abutment for a fitting to allow a precise and predetermined length of conduit 440 to fit within the fitting. Conveniently, segment 443 can have a length in the range of 0.5-3 inches, although any suitable length may be selected. The fitting may comprise a straight, hollow tube which couples adjacent conduits in end-to end relationship, or a "push to connect" fitting which includes gripping teeth or other protruding members to establish a locking connection to the conduits. Alternatively, the fitting may comprise an angled fitting to permit the conduit to change direction. The fitting may comprise a cap to fully or partially seal the conduit. The fitting may comprise a junction box or other specialized component of a fibre optic network. The preceding fittings are described merely by way of example, since it will be evident that wide variety of fittings may be engaged to segment 443.

As seen in FIG. 14, cylindrical end segment 443 can be formed from a length of stock conduit 440 by shaving a portion of the exterior with a rotary tool 444. Tool 444 comprises a bit having a hollow cylindrical shell 445, a solid cylindrical core 446 which is co-axial with shell 445, and an annular space 447 between shell 445 and core 446. Core 446 fits within bore 442 to align tool 444 with conduit 440. Cutting teeth 448 are located on the front face 449 of shell 445. Tool 444 includes a shaft 449a for engagement to a conventional electric drill (not shown). Tool 444 may be provided in a range of sizes to provide different diameters of outer cylindrical surface of segment 443 for engagement with a range of fittings.

An alternative approach to forming a junction between conduits 440 is shown in FIG. 16. An internal coupling tube 450 is provided, having an outside diameter selected to fit tightly within bore 442. Preferably, the outside diameter of coupling tube 450 is slightly larger than bore 442 so as to slightly expand bore 452 radially outward to provide a secure coupling. Coupling tube 450 is fitted within the bores 442 of two abutting conduits 440 so as to couple them together end to end. The exterior surface of the joint between the respective tubes may be wrapped with tape or shrink-wrapped 450a with a glue-backed material to form a secure and waterproof seal. Coupling tube 450 is relatively thin-walled so as to minimize intrusion into bore 442, but is sufficiently rigid so as to withstand crushing from the conduits 440, for example a metal such as aluminum or stainless steel.

It has been found that for a given material of conduit 440 there exists an optimum wall thickness which provides both sufficient strength and flexibility, using a minimum of material. In one example, conduit 440 is fabricated from HDPE and has a square cross-sectional configuration. The ratio of the diameter of bore 442 to the length of each side is about 14/25, for a ratio of about 0.56 (plus or minus 20%, 10% or 5%). That is, for a square conduit having an outside wall dimension of 12.5 mm in width and height, a suitable bore diameter is 7.0 mm. In another embodiment, the respective dimensions are 15 mm and 8.5 mm. It will be evident that the dimensions and the ratio described above can be varied, and merely represent a particular embodiment. For a conduit having a non-square, rectangular configuration, the respective ratio can apply with respect to the ratio between inside and outside dimensions of the height or width directions, or both.

Referring to FIGS. 15 and 18, a plurality of conduits 440 may be arranged in a bundle 470 consisting of a vertical stack of conduits, one conduit in width. The stacked conduits may be fastened together, for example with tape 451, heat shrink film or other fastening means applied at intervals along bundle 470. An alternative, not shown, is for the bundle to wrapped or otherwise covered along its full length, for example with a film that is wrapped around the entirety of the bundle, or a rigid enclosure that is configured to fully enclose a selected bundle of conduits. Bundle 470 may comprise any selected number of conduits 440, for example between 4 and 20 conduits. Bundle 470 may be inserted into a narrow main channel 452, shown in FIG. 18 without the need for an external duct to retain the multiple individual conduits. Bundle 470 may be formed at any convenient point in the manufacturing or installation process. For example, bundle 470 may be pre-formed and supplied to the installer. Alternatively, the installer may fasten the individual conduits together to form bundle 470 on site, prior to burial. The latter approach has the advantage that it allows the individual conduits 440 to slide relative to each other before being bound together in a tight bundle, for example when the bundle is flexed vertically in a manner that requires movement of conduits relative to each other within the bundle. On-site bundling also easily permits the installer to generate branches wherein one or more individual branch conduits 454 are separated from the bundle and flexed outwardly to form a branch.

In one example, shown schematically in FIG. 19, installation of conduits 440 comprises the steps of cutting a narrow channel 452 in a surface and either placing an individual conduit into the channel or a conduit bundle 470. As mentioned, bundle 470 may be prepared on site prior to burial. A branch junction location may be pre-installed, for example at a location where the installer may wish to provide a cable branch in the future. One such location might be a house or building lot that is not yet a recipient of an optic cable cable, but may become so in the future. In such cases, it is desirable to provide a method that facilitates the forming of future cable branches. Such a junction may be provided with conduits 440 by identifying a junction location along the main channel 452, and cutting a truncated branch channel 453 branching away from main channel 452 at this location. One of the conduits 454 within the bundle can be peeled away from bundle 470 and flexed laterally away from the axis of bundle 470 to fit into branch channel 453. The relative flexibility of conduits 440 permits the installer to form a relatively sharp bend at this location, to provide a branching conduit. The conduit branch terminates shortly after the junction, and serves as a stub 454 for future extension to the customer's location, shown in dotted lines in FIG. 19. For example, stub 454 and channel 453 may be about one meter in length prior to extension.

Following placement of the bundle 470 and stubs 454 within channels 452 and 453, the surface is restored, for example with cold patch asphalt 480, as seen in FIG. 18. In the above fashion, the conduit junctions are formed without the need for junction boxes, terminals or other bulky components that would require additional forming a more spacious vault within the surface. The branching network may thus be formed simply by cutting a network of narrow channels into the surface, which can be readily filled with a sealant. This simple system can potentially prevent the requirement of special permits for cutting larger-scale openings into the roadway or other surface.

Following restoration of the surface, the location of the branch may be marked for future access, for example by installing a permanent marker in the restored surface, or some other means of signaling the presence of branch channel 453.

In the above-described installation, future extension of individual branch conduits may be easily performed. The installer removes the sealant that was used to fill branch channel 453 and locates the stub 454 of conduit 440. An additional cut into the surface is made to continue the branch channel to the desired location. Conduit stub 454 can then be flexed upwardly out of the channel, a feature which is made possible by the flexibility of the HDPE material from which the conduit is made. An additional length of conduit is attached to stub 454, of a desired length to reach the customer's location. The additional conduit is joined to the stub in the manner described above. The newly-extended conduit is then buried within a newly cut channel, and the surface restored. According to this aspect, the installation is within a hard surface such as asphalt or concrete. The branch channel, when originally formed and installed, is restored with a removable material such as cold patch asphalt. This eliminates the need, when extending the branch, to perform a cutting operation to access the stub. Rather, the removable material can be readily removed in a simple fashion to expose the stub, which is then flexed upwardly from the channel for extension.

Figure 17:
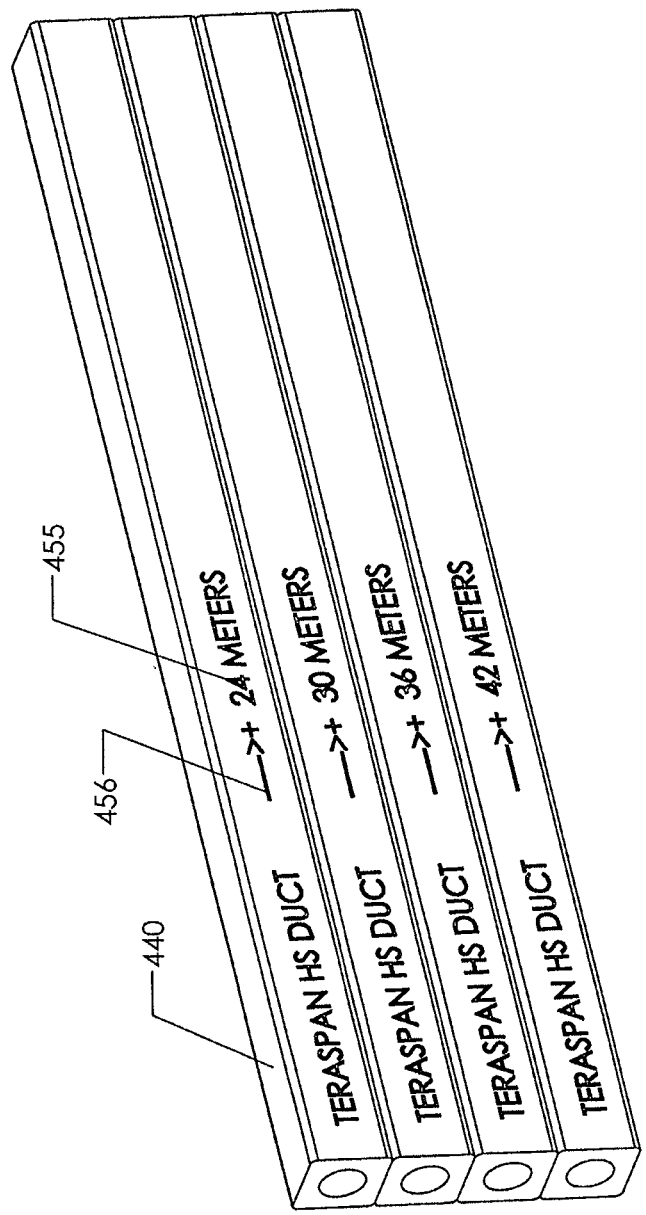
FIG. 17 is a perspective view of a bundle of the conduits of FIG. 11.

According to another aspect, shown in FIG. 17, conduits 440 may be provided with sequential distance markers to allow the installer to distinguish between individual conduits within a bundle. This function allows the installer to ensure that the appropriate conduit is directed to a particular branch or other location. Conventionally, when a bundle of conduits or cables are provided, the individual components are color-coded to provide this function. However, for on-site bundling, this would require supplying the installer with multiple reels of conduits in different colors. As well, there is a practical limit to the number of colors that can be easily distinguished, especially in conditions of low light, soiled conduits, etc. According to this aspect of the invention, conduits 440 are visibly marked with a sequence of distance markers 455, preferably printed on all sides thereof. For example, the conduits may be provided with markings at every meter. In any given reel of conduit, the distance markers do not repeat, such that the marker numbers are sequential and non-repeating for the full length of the supplied conduit. In addition, the conduits are marked with an indicator 456 (such as an arrow) which shows the direction in which the numbers are increasing, such that the installer can easily determine whether the numbers are increasing or decreasing in a given direction.

Optionally, the numerical values of markers 455 are stored in a database such as a computer database. The database may comprise a computer storage medium, and may be available on a website or other accessible database. The database may also include additional information about the waveguides associated with each of said conduits. Preferably, the database is secured such that only authorized persons have access thereto. In this fashion, any authorized person may be able to differentiate between the respective conduits within the bundle.

Markings 455 and 456 may be either generated when fabricating conduits 440 such that the conduits are supplied with such markings already in place, or the markings may be placed on the conduits at the time the bundles are formed, such as on-site. In either case, the numerical values for distance markers 455 are not re-set on a given reel or batch of conduit 440, in order that the numbers do not repeat but continuously increase over the length of the conduit.

When forming bundle 470, multiple conduits 440 are provided wherein the starting numbers differ from each other. This can be achieved in various ways, such as by withdrawing lengths of conduits from a single reel that has been marked with a non-repeating sequence of marker. Alternatively, lengths of conduit may be drawn from a plurality of reels from which segments of conduit have already been removed, such that the starting numbers are different, or removing and discarding variable lengths of conduit to generate variable starting numbers, or the reels may be initially supplied with the markings set such that the starting numbers differ randomly. In principle, the distance markings could either increase or decrease over the length of the conduit. However, it is preferable that the reels are configured such that as conduit is withdrawn, the number markings all increase, so as to avoid the complications that would arise if some of the numbers increase and others decrease in the various conduits.

As a result of bundle 470 being formed from multiple conduits 440, all having the distance markings which commence at a different starting point, it is possible to distinguish between individual conduits based on the relationship between distance numbers. For example, if it is known that a given conduit has the lowest numbered starting point, that conduit can be identified at any point in the bundle by having the lowest distance marking. The installer need only generate a record showing the distance markings in each of the conduits at any given point along the bundle, and the differences between the numbers will be maintained throughout the length of the bundle.

The above marking system provide various benefits, including the ability to distinguish between a large number of individual conduits, and also an easy means to determine the length of the conduit that has been installed. Further benefits relate to efficiency, in that the supplier is only required to supply conduit in a single color, and the installer is only required to retain the single color in stock.

As an alternative to the above marking system, conduits 440 may be marked in other ways, such as marking them at regular intervals with a single number (such as conduit no. 1, no. 2 etc.).

It will be seen that the present invention has been described by way of preferred embodiments of various aspects of the invention. However, it will be understood that one skilled in the art may readily depart from the embodiments described in detail herein, while still remaining within the scope of the invention as defined in this patent specification as a whole including the claims.

The invention claimed is:

1. A method of installing a conduit system for housing an optic fiber conduit system within a surface, the conduit system comprising a plurality of conduits, at least one of the conduits comprising a rectangular cross-sectional exterior configuration, the conduits comprising an axially-extending cylindrical or semi-cylindrical interior bore, the method comprising the steps of:
coupling together the plurality of conduits in end to end relationship to form a conduit string by inserting a coupling member comprising a removable sleeve within the bores of adjacent ones of said conduits; wherein said sleeve expands the bores of the conduits radially outwardly when inserted therein;
forming a trunk channel within said surface, said channel having a width and depth for fitting said conduit string therein; and
installing said conduit string within said channel, and restoring the surface with a material.

2. The method of claim 1 comprising the further steps of forming at least one branch by forming a branching channel connecting with but leading away from the trunk channel, separating one or more individual conduits from the plurality of conduits and directing said one or more individual conduits into said branch channel.

3. The method of claim 2 wherein said surface comprises concrete, asphalt or other hard surface, said branch channel and said individual conduit comprise a stub, said surface is restored with a removable material, and said method comprises the further steps of extending said stub during a subsequent installation stage, said extending comprising the steps of removing the material at said branch channel to expose the stub of conduit, extending said channel within said surface, exposing the terminal end of said stub above the surface, and joining a length additional conduit to said stub, installing said extended conduit with the extended branch channel, and restoring the surface.

4. The method of claim 1, wherein said step of coupling further comprises forming an end segment in respective ones of said conduits having a cylindrical external configuration, providing a tubular cylindrical external sleeve, and fitting said external sleeve over the respective ones of said end segments in end to end relationship to join said conduits together.

5. The method of claim 4 wherein said end segment is formed within each of said conduits by removing a portion of said conduit with a rotary cutting tool, said tool comprising an exterior shell having at least one cutting blade thereon, a central rod for insertion into said bore, and an annular space between the rod and the shell wherein contacting an end of the conduit with said rotating tool forms said segment.

6. The method of claim 1 wherein the plurality of conduits is bundled together at an installation site.

7. The method of claim 2 comprising the further step of providing sequential, non-repeating distance and directional markers on each of said conduits extending the full length thereof, bundling the plurality of conduits together into a bundle wherein the starting numbers on respective ones of said conduits within the bundle of conduits all differ from each other, determining the numerical differences in value between the markers on said conduits, and thereby differentiating the respective ones of said conduits from each other throughout said installation.

8. The method of claim 1 wherein said at least one conduit is monolithic.

9. The method of claim 1 wherein said at least one conduit has a width of at most 15 mm.

10. The method of claim 1 wherein said at least one conduit has a ratio of diameter of the bore to exterior diameter of the conduit of about 14:25.

11. The method of claim 10 wherein said ratio is within range of plus or minus 5%, 10% or 20% of 14:25.

12. The method of claim 1 wherein said at least one conduit comprises HDPE plastic.

13. The method of claim 11 wherein said at least one conduit is square in cross-section.

14. The method of claim 1 comprising the further step of forming a bundle comprising multiple ones of said rectangular conduits arranged as a stack one conduit in width.

* * * * *